US009349087B2

(12) United States Patent
Cleary

(10) Patent No.: US 9,349,087 B2
(45) Date of Patent: May 24, 2016

(54) METHOD OF GENERATING A RANDOM MARKER
(71) Applicant: Smartwater Technology Limited, Liverpool (GB)
(72) Inventor: Michael Cleary, Liverpool (GB)
(73) Assignee: SMARTWATER LIMITED (GB)
( * ) Notice: Subject to any disclaimer, the term of this patent is extended or adjusted under 35 U.S.C. 154(b) by 18 days.
(21) Appl. No.: 14/389,585
(22) PCT Filed: Mar. 28, 2013
(86) PCT No.: PCT/GB2013/050834
§ 371 (c)(1),
(2) Date: Sep. 30, 2014
(87) PCT Pub. No.: WO2013/144645
PCT Pub. Date: Oct. 3, 2013
(65) Prior Publication Data
US 2015/0048156 A1 Feb. 19, 2015
(30) Foreign Application Priority Data
Mar. 30, 2012 (GB) .................................. 1205797.2
(51) Int. Cl.
| | |
|---|---|
| *G06K 19/06* | (2006.01) |
| *G03G 21/04* | (2006.01) |
| *G06K 19/08* | (2006.01) |
| *G07D 7/20* | (2016.01) |
| *B42D 25/29* | (2014.01) |
| *G06K 1/12* | (2006.01) |
| *G06K 7/015* | (2006.01) |
| *G06K 7/12* | (2006.01) |
| *G06K 7/14* | (2006.01) |

(52) U.S. Cl.
CPC .......... *G06K 19/06056* (2013.01); *B42D 25/29* (2014.10); *G03G 21/046* (2013.01); *G06K 1/121* (2013.01); *G06K 7/015* (2013.01); *G06K 7/12* (2013.01); *G06K 7/1434* (2013.01); *G06K 19/06046* (2013.01); *G06K 19/086* (2013.01); *G07D 7/20* (2013.01)

(58) Field of Classification Search
CPC ...................................................... G06K 19/06
USPC .......................................................... 235/494
See application file for complete search history.

(56) References Cited

U.S. PATENT DOCUMENTS

| | | | | |
|---|---|---|---|---|
| 5,869,160 | A | * | 2/1999 | Mason et al. ................ 428/40.2 |
| 7,162,035 | B1 | | 1/2007 | Durst et al. |
| 7,938,333 | B2 | | 5/2011 | Jones |
| 8,145,345 | B2 | * | 3/2012 | Magee et al. ................ 700/131 |
| 2004/0112962 | A1 | * | 6/2004 | Farrall ..................... G06K 7/12 |
| | | | | 235/462.01 |
| 2006/0091209 | A1 | | 5/2006 | He |
| 2008/0240430 | A1 | | 10/2008 | Pinchen et al. |
| 2011/0164748 | A1 | | 7/2011 | Kohlert et al. |
| 2013/0022238 | A1 | * | 1/2013 | Wood et al. ................... 382/103 |

FOREIGN PATENT DOCUMENTS

| | | |
|---|---|---|
| DE | 102007049540 A1 | 4/2009 |
| EP | 1947592 A1 | 7/2008 |
| GB | 2446300 A | 8/2008 |
| WO | 2004070667 A2 | 8/2004 |
| WO | 2007131043 A2 | 11/2007 |

OTHER PUBLICATIONS

Examination Report dated Nov. 30, 2015 in European application No. 13 719 137.5—4 pages.

* cited by examiner

*Primary Examiner* — Christle I Marshall
(74) *Attorney, Agent, or Firm* — Burns & Levison LLP; Joseph M. Maraia

(57) ABSTRACT

There is disclosed by the present invention a method of generating a marker to distinguish between genuine and counterfeit goods by applying to surfaces of items, articles, goods, vehicles, fabrics and/or premises, the method includes: applying at least one coding to the surface, where the coding is applied randomly such that the coding provides a unique pattern when subjected to a particular type of stimulus.

54 Claims, 1 Drawing Sheet

METHOD OF GENERATING A RANDOM MARKER

RELATED APPLICATIONS

This application is the U.S. National Stage of International Application No. PCT/GB2013/050834, filed on Mar. 28, 2013, published in English, which claims priority to GB1205797.2, filed Mar. 30, 2012, the entire teachings of the above applications are incorporated herein by reference.

FIELD OF THE INVENTION

The present invention teaches a method of generating a marker for use in marker systems. In particular, the invention herein described is directed towards generating a marker including a coding pattern based on different forms of stimulation to produce different forms of luminescence from different parts of the coding pattern wherein the coding pattern is measured and recorded for comparison with patterns held on a database. Further, the present invention is directed towards a method and system of indentifying an object comprising said marker.

BACKGROUND TO THE INVENTION

In recent years, the use of marker systems has been particularly useful in preventing crime and for tracking and identifying the authenticity of items. Such marker systems, as have been developed by the applicant for many years, have found particular application in the fields of security, counterfeiting and crime prevention/deterrence, for example as described in WO 93/07233, GB 2369078, GB 2410208 and GB 2413675, amongst others. Analysis of the surface onto which the marker system is placed or deployed can provide a reliable method of tracing or authenticating items, articles, goods, vehicles or persons.

Bar codes have been used for a significant time and are an accepted way of marking items for identification. They provide data to uniquely identify the item to which they are attached; the data being optically represented. The most common types of barcodes in use are linear barcodes, such as the UPC and EAN barcodes, although two dimensional bar codes are also in use. The two dimensional barcode is based on providing indications at various points within a matrix, the positioning of the indications detailing the unique code.

Barcodes are now extensively used for tasks ranging from tracking mail, monitoring the stock levels, determining areas where employees have been, identifying patient information and provide details for grocery goods, etc. However, the use of barcodes has at least one major drawback. Barcodes are easy to copy, duplicate and/or modify. In fact, a readable copy of a barcode can be produced by simply taking a copy of the original using a standard photocopy machine. Because barcodes are so easy to copy, they are particularly vulnerable to fraudulent reproduction.

One way to reduce the risk of a barcode being copied, has been to provide a laminate layer which only allows infra red light to pass through over the barcode. The laminate layer prevents the barcode from being copied using a standard photocopier.

Additionally, some systems using a laminate layer will have the additional security feature of destroying the barcode underneath when someone attempts to remove the laminate layer.

However, even with this additional security measure, as infra-red scanners are commonplace, it has become relatively easy to duplicate the barcode contained underneath the laminate layer and therefore, barcodes remain vulnerable to culprit attack.

Other coding systems using materials that fluoresce under different forms of radiation have been developed as shown in WO2008113962A1 and US2007205284A1. However, these involve the use of fluorescent materials in pre-set positions. There is difficulty in printing a large number of images, each one of which is unique. Forms of printing such as thermal printing used for producing bar codes do not lend themselves easily for use with some fluorescent materials. Further, upconverting materials is difficult due to the weak emission of fluorescent materials and high concentration/coat weight required to obtain a measureable output.

Therefore, there is a need for an improved method and system for randomly generating a unique marker and additionally an improved method and system for identifying an object having a marker wherein the marker may have been randomly generated.

SUMMARY OF THE INVENTION

In one aspect of the invention, there is provided a method of generating a marker to distinguish between genuine and counterfeit goods by applying to surfaces of items, articles, goods, vehicles, fabrics and/or premises, the method comprising: applying at least one coding to the surface, wherein the coding is applied randomly such that the coding provides a unique pattern when subjected to a particular type of stimulus.

Preferably a plurality of codings may be applied. Preferably, different ones of the plurality of codings provide a unique pattern when subjected to a different particular type of stimulus. Additionally, the at least one coding may be applied as at least one layer. Preferably, each coding is applied as a separate layer. Preferably, the separate layers are overlaid. Preferably, the uppermost layer of the overlaid layers comprises an IR fluorescent material. Optionally, the one or separate layers are transparent.

In a further aspect of the invention, the unique pattern may be based upon any one or more of: the position of elements of the coding only visible under UV radiation, the visible colour of elements of the coding only visible under UV radiation, the position of the visible elements of the coding, the colour of the visible elements of the coding, the position of elements of the coding only visible under IR radiation and the visible colour of the elements of the coding only visible under IR radiation.

Preferably, the method further comprises providing one or more alignment features in respect of the at least one coding to assist in aligning the digital camera to the at least one coding. Preferably, the alignment features comprise visible features. Preferably, the alignment features comprise features which are visible when the at least one coding is subjected to one or more forms of stimulus.

In a further aspect of the invention, the one or more codings may be applied by spraying means. Preferably, the distance between the surface and the spraying means may be varied. Preferably, the angle between the surface and the spraying means may alternatively or additionally be varied. Alternatively or additionally, the one or more codings may be applied by random application using one or more dots.

Preferably, the method further comprises the step of applying a layer of varnish over the one or more codings. Preferably, the varnish is a matt varnish. Preferably, the one or more codings comprise one or more of visible materials, materials fluorescing under UV and materials fluorescing under IR.

In a further aspect of the invention, there is provided a marker generated by the method. Preferably, the marker is hidden inside an overt pattern to form a covert marker. Preferably, the covert marker is formed between the lines of a visible bar code. Preferably, the covert marker is overlaid by a visible bar code or other apparent overt coding mark. Preferably, the generated marker may be directly formed on the surface of the item to be marked. Additionally or alternatively, the generated marker may be used on a label that may be applied to the item to be marked. Preferably, the generated marker is used in combination with existing technologies such as bar codes or coloured spatial patterns.

In a further aspect of the invention, there is provided a method of identifying a marker applied to the surface of items, articles, goods, vehicles, fabrics and/or premises, wherein the marker comprises one or more codings, the method comprising: using a digital camera to obtain measurements from each coding of the marker when subjected to a particular type of stimulus; comparing the recorded measurements defining the coding pattern produced by the coding under the stimulation with a database comprising measurements of coding patterns; and matching the coding pattern with a coding pattern from the database.

Preferably, the particular type of stimulus includes one or more of stimulation by UV and IR radiation. Preferably, if the coding pattern is not matched with a coding pattern from the database when the marker is subjected to a first particular type of stimulus, the recorded measurements of the coding pattern are compared to the database when the marker is subjected a second particular type of stimulus. Preferably, the recorded measurements of the coding pattern are compared to the database when the marker is subjected to a further particular type of stimulus until the coding pattern is matched to a coding pattern on the data base.

Preferably, the method further comprises illuminating the coding whilst obtaining the measurements from each coding. Preferably, the digital camera takes one or more images of the marker emissions under one or more forms of stimulation. Preferably, the digital device operates one or more light sources. Preferably, the digital device operates the one or more light sources sequentially.

Preferably, the method further comprises the step of transmitting the one or more images to a central server via suitable telemetry for searching against the database comprising measurements of coding patterns. Preferably, the transmission may also be to a local computer or lap-top or mobile phone, such transmission occurs via USB and/or via blue-tooth. Preferably, the method further comprises transmitting the results of the search from a central server back to the in-field measurement team and others if required.

Preferably, the method further comprises aligning the digital camera to the coding pattern. Preferably, the digital camera is aligned with the coding pattern using physical markers. Preferably, software on the digital camera aligns the digital camera with the coding pattern. Preferably, the software on the digital camera changes the orientation of the recorded coding pattern such that it corresponds to the orientation of the coding patterns in the data base.

In a further aspect of the invention, there is provided a system for identifying a marker applied to the surface of items, articles, goods, vehicles, fabrics and/or premises, wherein the marker comprises one or more codings, the system comprising: a reader adapted to obtain measurements defining the coding pattern produced by each coding of the marker when subject to a particular type of stimulus; and a data processing system comprising a database of coding pattern measurements; wherein the data processing system is configured to compare the recorded coding pattern measurements obtained by the reader to the measurements in the database, and wherein the data processing system is configured to match the measurements from the coding pattern with a coding pattern from the database.

Preferably, the reader further comprises a digital camera. Preferably, the digital camera forms part of the reader and is orientated specifically in respect of the marker such that each coding pattern can be identified. Preferably, the digital camera comprises an alignment mechanism allowing the camera to be correctly aligned to the marker such that each coding pattern occurs in the same position in an image. Preferably, the alignment mechanism comprises alignment marks on the outer body of the reader which can be used to correctly align it to the marker. Preferably, wherein the marker comprises one or more alignment features to assist in aligning the digital camera to the marker. Preferably, wherein the alignment features comprise visible features. Additionally or alternatively, the alignment features comprise features which are visible when the marker is subjected to one or more forms of stimulus.

Additionally or alternatively, the digital camera comprises software to align the recorded coding pattern measurements obtained by the reader to the measurements in the database. Preferably, the digital camera comprises illumination means configured to illuminate the marker and capture an image of the coding pattern during illumination. Preferably, the reader comprises software configured to ensure that the coding pattern is measured only during the period when the illumination means is on.

Preferably, the reader further comprises lasers. Preferably, the reader further comprises an IR diode laser and a beam expander. Preferably, the reader further comprises an IR LED array. Preferably, the reader is battery powered.

In a further aspect of the invention, the data processing system is configured to store the measurements. Preferably, the data processing system is configured to store the measurements as separate data sets. Preferably, the data processing system is maintained on a laptop. Preferably, the data processing system is maintained as a program on a mobile phone.

BRIEF DESCRIPTION OF THE DRAWINGS

The foregoing will be apparent from the following more particular description of example embodiments of the present disclosure, as illustrated in the accompanying drawings in which like reference characters refer to the same parts throughout the different views. The drawings are not necessarily to scale, emphasis instead being placed upon illustrating embodiments of the present disclosure.

DESCRIPTION OF THE INVENTION

Figure 1A:
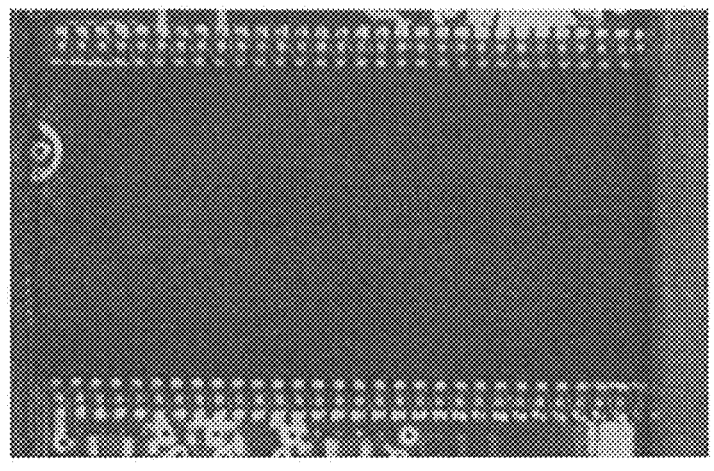
FIGS. 1a and 1b show design features of a printed circuit board ("PCB") on a production line, which is used as an example of one of the alignment methods of the invention. These provide a good matrix for alignment of the random fluorescent image shown under UV and not IR.

The invention described herein provides a way of generating and recording randomly generated unique coding patterns or images. The coding pattern is generated randomly by applying a mark to a substrate via different means and conditions. The coding pattern may be based upon:
  the position of elements of the pattern only visible under UV radiation
  the visible colour of the elements of the pattern only visible under UV radiation the position of the visible elements of the pattern
the colour of the visible elements of the pattern
the position of elements of the pattern visible under IR radiation
the visible colour of the elements of the pattern only visible under IR radiation
the information provided from all the above sets of data Further, the invention described herein provides a system wherein pattern recognition may be performed in-field using a remote hand held device which may operate one or more light sources sequentially and a camera which takes one or more photographs or images of the coding pattern under each light source. The light sources may be LED based in order to get a beam of wide cross-section. The one or more photographs or images may then be stored as separate data sets on the hand held device. Further, these data sets may then be transmitted via USB or Bluetooth to a dedicated mobile phone or computer. The data sets may then also be transmitted to a central server via a suitable telemetry link. The above sequence of events may be controlled by a mobile phone application.

Further, the invention described herein provides for various controls for the rotational and translational alignment of the device in respect of the coding pattern. These controls may include covert alignment marks being provided on the surface of the marked item so as to allow accurate placement of the device. This may be backed-up by software that can rotate an image to get alignment and may also be capable of identifying an incomplete pattern. The invention described in the present application will now be described in more detail below.

The present invention teaches a method and apparatus for producing large numbers of unique patterns. This may be achieved via a random distribution of marks onto a 2-dimensional surface, typically by spraying a large surface and then cutting sections from this surface to produce labels, or alternatively by spraying items on a production line.

In a one embodiment of the invention, there is provided a method of generating a marker to distinguish between genuine and counterfeit goods by applying to surfaces of items, articles, goods, vehicles, fabrics and/or premises, the method comprising one or more layers of coding, wherein each layer of coding is applied randomly such that each layer of coding provides a unique pattern when subjected to a particular type of stimulus.

Preferably, the marker may be randomly applied to a surface by spraying. It is very unlikely that a spray falling onto a surface will give two identical patterns. However, to minimise the possibility of two identical patterns, the distance to the surface and the angle of spraying may be varied.

In one embodiment of the invention a coding pattern may be applied randomly to a surface of the item to be marked, either by applying the pattern to a label or suitable layer which may be placed onto the item or applying the pattern directly onto the item itself. The pattern may be formed through the use of materials which emit specific colours when irradiated with different forms of stimulation. When the pattern is applied to a label, the pattern may be checked initially to ensure it is unique and is suitably capable of being a coding pattern; if so then it may be applied to an item to make that item unique and traceable. The item can then be identified in field, possibly along a supply chain, as being valid product. The item itself may have visible features which remain visible under different forms of radiation and these may be used to add to the features of the pattern.

The present invention provides a covert coding method that may be used in isolation or combined with existing technologies; for example, the coding patterns generated as described herein may further be used along with barcodes and/or along with coloured spatial patterns. Where the coding method is applied to an existing overt marker, the method advantageously provides a method of preventing the copy of existing overt markers and therefore adds to the security. Typical the overt measures include label designs of known brands.

A further embodiment of the invention involves a steganographic approach where the covert code is hidden inside an overt code. For example, in one embodiment there may be provided a coding pattern generated by the coding method described herein, formed between the lines of a visible bar code. Additionally or alternatively, the coding pattern may be overlaid by a visible bar code or other apparent overt coding mark.

Alternatively, the covert code may be included between the lines of a visible bar code or additionally or alternatively may be overlaid by a visible bar code or other apparent overt coding mark.

The present invention advantageously provides a method of generating a virtually infinite number of codes which may be analysed in the field. The number of codes available means that the codes can be changed frequently. In the prevention of counterfeits, the codes could be changed to show a particular plant of manufacture. Likewise the time of manufacture could be identified and the codes could be changed to indicate the year, month, week, day or even hour when the item was produced.

Additionally, as critical parts of the code may be covert, copying is made difficult. Given that the code could be changed rapidly, perhaps on a daily or more frequent basis, then it should be possible for manufacturers to stay ahead of the counterfeiters. The code may be changing quicker than counterfeiters can copy it and a log of serial number and code would be virtually impossible, or financially unfeasible, to duplicate.

In a further embodiment of the invention, each randomly generated coding pattern may be checked to be unique prior to use.

Where the method for generating the marker is by random application of the spatially separated pattern, the pattern may be applied using a multitude of dots. The random nature of the positioning of the dots formed through random application provides a large number of variables. The position of each dot in the random pattern may be defined in terms of the pixel number and this provides very good discrimination in terms of the exact position, size and shape of the fluorescent mark.

Additionally, a varnish may be applied after all the coding layers have been applied to the surface of the marked item or label to protect the dots and prevent any from becoming dislodged and rendering the code meaningless. Additionally, the varnish may be a matt varnish. This has the advantage that it also prevents reflections of the light sources from a shiny surface entering the lens. The varnish prevents that feature of the mark are lost or damaged. Advantageously, the matt varnish avoids refection of the visible portion of the light source radiation, particularly the UV LED, being captured as part of the image and rendering the image ineffective. Likewise before measurement all marks should be wiped to ensure they are clean.

The present application provides that other non-limiting features may be added to increase the dimensionality of the coding pattern by providing for a different visible colour to each point and/or a coloured output from various forms of emitter responding to various forms of stimulation.

In a preferred embodiment of the invention and as each type of fluorescence is specific to the form of stimulation, materials fluorescing under UV may be combined with materials fluorescing under IR with no interference between the two. These may be combined in the one formulation and applied at the same time or applied as separate layers, one over the other. As these layers may be transparent they can be overlaid with preferably the IR fluorescent material uppermost.

In a further embodiment of the invention there is provided, a code generated by the method as substantially described herein.

The generated code may be used in combination with existing technologies such as bar codes or coloured spatial patterns, additionally or alternatively, the generated code may be used to generate a further barcode.

After the random coding pattern is applied to the item to be marked or label, it may then be recorded using a suitable reader. A digital photograph of each randomly marked label may be taken by a reader or scanner and may be stored on a database. The exact position of each feature of such a random pattern may be measured. One or more discriminating features may be used to distinguish one pattern from another. Discriminating features may include but are not necessarily limited to:

the position of the feature;
the shape of the feature;
the colour of the feature;
the form of illumination;
the size of the feature; and
the rate of change in pixel values across the feature and at the edge of the feature.

Commercial vision systems can provide the necessary software backup to handle this data. A digital library or database of the coding pattern images may therefore be created which may further contain details of the origin of the coding pattern. Such details may include, but is not limited to, the date of manufacture of the coding pattern, the owner associated with coding pattern and the address of the owner.

To keep track of the alignment of the image of the coding pattern, the present invention additionally may provide for one or more alignment mechanisms, both physical and software based. This mechanism allows the camera to be aligned correctly to the coding pattern so that the points forming the pattern, e.g. the marker emissions, always occur in the same position in the camera field of view, and in any resulting image, such as a photograph. The alignment mechanism may consists of more than one mark on the surface being measured and features on the reader which may be placed on the surface to overlap with these marks.

In one embodiment the reader is pressed into position on the surface to be analysed so that a light tight seal is formed with the surface. Two different marks on opposite sides of the reader are superimposed onto two different marks present on the surface to be analysed. Different marks may be used to ensure the correct alignment of the reader and to eliminate the possibility of the scanner being misaligned by 180 degrees.

In a further embodiment of the invention the substrate onto which the mark is applied has a set or fixed pattern on its surface which acts as a point of reference for alignment.

In a further embodiment of the invention, a vision system has been developed that recognises the size and shape of the dots forming the coding pattern using the method of randomly generating the code. Alternatively, commercial vision systems may be modified such that they are capable of recognising the size and shape of the dots forming the coding pattern. Preferably, the system can be programmed to recognise a dot that has been touched before drying and/or may have been distorted along one or more axes.

Additionally, the software may be trained to account for one or more of the following variables:
Size of dot
Shape of dot
Colour of dot
Size of mark
Colour of background
The rate of change in colour at the edge of and across the dot The above list of variables is exemplary only and therefore the person skilled in the art would appreciate that the software is capable of considering other variables and therefore is not limited to considering these variables only.

The software may be configured to consider each of these variables individually and then in groups. The variables are used in training the software to discriminate between different patterns. The system may comprise both pattern recognition algorithms and pattern matching algorithms. The pattern recognition algorithms allow the digital library to be quickly scanned when an image from in the field is being compared against the database. The pattern matching algorithms provide a degree of certainty to ensure that the results of the search yield a 100% match.

In one embodiment of the invention, there is provided a method for viewing the code generated by the method described herein. Particularly, the code may be viewed by providing different forms of stimulation producing codes for each form of excitation employed. In one embodiment of the invention, UV and IR stimulation are specifically provided for.

In one embodiment of the invention, the method may be an automated method.

In one embodiment the colour in each position of the pattern may be measured under visible, UV and IR radiation via a digital camera. The colours may be described in terms of the level of each of the primary colours present, or RGB values. The range of values for each fluorescent colour used is predetermined and is used as the basis for identification of the colours present in each case. The digital camera is held within a reader. An alignment mechanism allows the camera to be aligned to the pattern so that the points forming the pattern always occur in the same position in the camera field of view. The alignment mechanism may consist of more than one mark on the surface being measured and features on the reader which is placed on the surface to overlap with these marks. Additionally software alignment is applied to get the final accurate alignment of the image.

In a further embodiment the RGB value may be used to identify different shades or blends of colour. These may be used to obtain further levels of coding by recognising different reds, yellows, greens and blues all from the same form of stimulation and also more subtle colour shades.

In a further embodiment of the invention, a reader may be used in the field to identify the coding pattern on marked items.

The reader used in this way such that it is placed to allow a photographic image of the whole mark to be taken. Subsequent processing to identify the mark will initially involve identifying just some features of the unknown from specific areas. This will allow alignment and orientation of the in field image with those in the library and discarding all those standards that do not have these features. Those that have the required features are then aligned and the whole image studied to find a match.

A digital camera may be used within the reader to record the code and suitable software may be used to illuminate each light source and take an image, such as a photograph, of the pattern during the illumination periods. The images may be stored as separate data sets and transmitted to either a mobile phone via blue tooth a local computer via USB or blue tooth, or similar, or to a database on a central server via suitable telemetry. In all cases the colour images are searched against a database and the results may then be transmitted back to the measurer, or measurement team, and other parties if desired.

The images taken may be stored as separate data sets and processed locally using a mobile phone app or a suitable program on a laptop. Alternatively, they may be sent to a central server as two separate data sets.

The reader may be software controlled so that images of the coding pattern may only be taken during the period when one of the light sources is lit. The reader may be battery powered and contain light sources, digital camera and a printed circuit board to undertake simple functions such as firing the lights.

In a further embodiment of the current invention the timing of the function of the lamps and camera is controlled via software on either a lap-top or via an app and a mobile phone. Of key importance is the timing of the light sources and camera operation and the software is written to control this.

The reader may have alignment marks on its outer body which are used to correctly align it to the pattern on the surface. This can be done through:
 visible marks specifically applied to the surface for this purpose
 design features of an existing label Additionally, the software can perform the alignment in various ways. An example is given below based upon the marking of printed circuit boards. The photographs show that the substrate provides a complex framework to provide a quick and easy method of alignment, the data provided includes:
 the differences in the colour of the fluorescent output placed at specific points;
 the fluorescent output of an existing brand label;
 when in position the light sources on the reader are fired sequentially, they both emit partially in the visible and this allows a visual image of the substrate to also be captured.

Typical images are shown in FIG. 1.

Figure 1B:
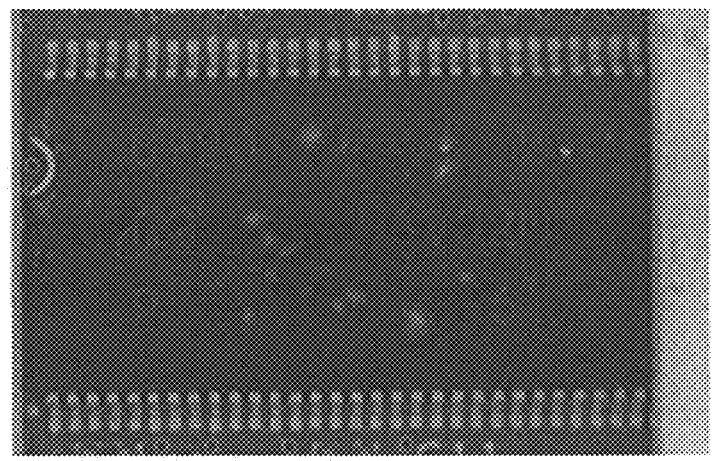

FIGS. 1a and 1b show design features of a printed circuit board ("PCB") on a production line, which is used as an example of one of the alignment methods discussed above. These provide a good matrix for alignment of the random fluorescent image shown under UV and not IR.

Due to the relative weak emission from Infra red up-converters, lasers may be used to stimulate a measureable emission from these materials. However, these devices produce a very fine spot and often do not function well in covering a wide area.

Therefore, in a further embodiment of the current invention an IR diode laser is used with a beam expander to cover the required area. Alternatively, an IR LED array can be used to provide sufficient energy to show fluorescence from IR up-conversion over the required area.

As detailed above, preferably, the positioning of the camera is controlled. It is also preferable to correctly place the camera in relation to the image in terms of its position both translational and rotational so that it is the same as that held in the library. This may be done by physical alignment of the reader on the surface and/or optionally may be aligned by the software.

In terms of the physical alignment this may be performed by aligning marks on the reader containing the camera with marks placed on the surface of the marked item being studied.

Preferably, the physical alignment can then be further improved on through the use of software.

The software alignment may use two dots of a different fluorescent colour to the dots forming the pattern and align itself to these.

Additionally, as the random pattern may be applied to a label to validate the label and the features of the label may be used as an alignment mechanism. Many premier brand labels are copied and such a covert feature added to the label would prevent an exact copy being made. A digital image, such as a photograph, of each randomly marked label may then be taken and stored on a database. The label design may provide an additional reference point to the position of the features of the random mark.

In a further embodiment the copy of the image, obtained in field, is searched against the database or digital library of coding pattern images. The software searches for an image which can be matched with the copy of the image. In a database of unique patterns there will only be one image that can be aligned and when this is found, then the unknown has been identified and the search completed.

The software is used to analyse data from the emissions under one light source first and from this to identify possible matches. If needed it may then use data from the second light source to eliminate possible match options from those found and so identify the match. Thus, when more than one candidate is identified then the second form of illumination may be used to differentiate these options to identify a single search result.

Preferably, the software is programmed such that a success rate of 100% is achieved. Therefore, where a field image is run against the results in the database under a first form of stimulation but a 100% success rate is not achieved and/or multiple search results are obtained, the field image is run against the results in the database under the second form of stimulation. Preferably, only the possible matches in the search results of the first search are run under the second form of stimulation to reduce computing processing requirements. The search results obtained under the second form of stimulation will be used to identify a specific match to give a 100% match.

If no such single match can be found on this basis then the process can be repeated on images taken under other forms of illumination. Two specific light sources are used to produce covert marks with UV and IR radiation. However, they also provide irradiance in the visible and so this can also be studied, additionally a visible source may also be used.

Various alterations and modifications may be made to the present invention without departing from the scope of the invention. Those skilled in the art may be aware of other methods of application of the present invention, although examples of use have been given they are not designed to be limiting.

A number of embodiments have been described herein. However, it will be understood by persons skilled in the art that other variants and modifications may be made without departing from the scope of the embodiments as defined in the claims appended hereto.

The invention claimed is:

1. A method of generating a marker to distinguish between genuine and counterfeit goods by applying to surfaces of items, articles, goods, vehicles, fabrics and/or premises, the method comprising:
 applying at least one coding to the surface, wherein the coding is applied randomly such that the coding provides a unique pattern when subjected to a particular type of stimulus, wherein the at least one coding is applied by spraying means.

2. The method of claim 1, wherein a plurality of codings are applied.

3. The method of claim 2, wherein different ones of the plurality of codings provide a unique pattern when subjected to a different particular type of stimulus.

4. The method of claim 1, wherein the at least one coding is applied as at least one layer.

5. The method of claim 4, wherein each coding is applied as a separate layer.

6. The method of claim 5, wherein the separate layers are overlaid.

7. The method of claim 6, wherein the uppermost layer of the overlaid layers comprises an IR fluorescent material.

8. The method of claim 4, wherein the one or separate layers are transparent.

9. The method of claim 1, wherein the unique pattern is based upon any one or more of: the position of elements of the coding only visible under UV radiation, the visible colour of elements of the coding only visible under UV radiation, the position of the visible elements of the coding, the colour of the visible elements of the coding, the position of elements of the coding visible under IR radiation and the visible colour of the elements of the coding only visible under IR radiation.

10. The method of claim 1, further comprising providing one or more alignment features in respect of the at least one coding to assist in aligning the digital camera to the at least one coding.

11. The method of claim 10, wherein the alignment features comprise visible features.

12. The method of claim 10, wherein the alignment features comprise features which are visible when the at least one coding is subjected to one or more forms of stimulus.

13. The method of claim 1, wherein the distance between the surface and the spraying means is varied.

14. The method of claim 1, wherein the angle between the surface and the spraying means is varied.

15. The method of claim 1, wherein the one or more codings are applied by random application using one or more dots.

16. The method of claim 1, further comprising the step of applying a layer of varnish over the one or more codings.

17. The method of claim 16, wherein the varnish is a matt varnish.

18. The method of claim 1, wherein the one or more codings comprise one or more of materials fluorescing under UV and materials fluorescing under IR.

19. A marker applied to surfaces of items, articles, goods, vehicles, fabrics, and/or premises, the marker comprising: at least one coding, wherein the coding provides a unique pattern when subjected to a particular type of stimulus,
wherein the marker is hidden inside an overt pattern to form a covert marker, and
wherein the covert marker is formed between the lines of a visible bar code.

20. The marker of claim 19, wherein the covert marker is overlaid by a visible bar code or other apparent overt coding mark.

21. The marker of claim 19, wherein the marker is directly formed on the surface of the item to be marked.

22. The marker of claim 19, wherein the marker is used on a label that may be applied to the item to be marked.

23. The marker of claim 19, wherein the marker is used in combination with at least one of: bar codes and coloured spatial patterns.

24. A method of identifying a marker applied to the surface of items, articles, goods, vehicles, fabrics and/or premises, wherein the marker comprises one or more codings, the method comprising:
using a digital camera to obtain measurements from each coding of the marker when subjected to a particular type of stimulus;
comparing the recorded measurements defining the coding pattern produced by the coding under the stimulation with a database comprising measurements of coding patterns; and
matching the coding pattern with a coding pattern from the database,
wherein the digital camera comprises an alignment mechanism allowing the camera to be correctly aligned to the marker such that each coding pattern occurs in the same position in an image, and
wherein the alignment mechanism comprises alignment marks on the outer body of the reader which can be used to correctly align it to the marker.

25. The method of claim 24, wherein the particular type of stimulus includes one or more of stimulation by UV and IR radiation.

26. The method of claim 25, wherein if the coding pattern is not matched with a coding pattern from the database when the marker is subjected to a first particular type of stimulus, the recorded measurements of the coding pattern are compared to the database when the marker is subjected a second particular type of stimulus.

27. The method of claim 26, wherein the recorded measurements of the coding pattern are compared to the database when the marker is subjected to a further particular type of stimulus until the coding pattern is matched to a coding pattern on the database.

28. The method of claim 24, further comprising illuminating the coding whilst obtaining the measurements from each coding.

29. The method of claim 24, wherein the digital camera takes one or more images of the marker emissions under one or more forms of stimulation.

30. The method of claim 29, wherein the digital device operates one or more light sources.

31. The method of claim 30, wherein the digital device operates the one or more light sources sequentially.

32. The method of claim 24, further comprising the step of transmitting the one or more images to a central server via suitable telemetry for searching against the database comprising measurements of coding patterns.

33. The method of claim 32, wherein the transmission occurs via at least one of: USB and blue-tooth.

34. The method of claim 32, further comprising transmitting the results of the search to an in field measurement team.

35. The method of claim 24, further comprising aligning the digital camera to the coding pattern.

36. The method of claim 35, wherein the digital camera is aligned with the coding pattern using physical markers.

37. The method of claim 35, wherein software on the digital camera aligns the digital camera with the coding pattern.

38. The method of claim 37, wherein the software on the digital camera changes the orientation of the recorded coding pattern such that it corresponds to the orientation of the coding patterns in the database.

39. A system for identifying a marker applied to the surface of items, articles, goods, vehicles, fabrics and/or premises, wherein the marker comprises one or more codings, the system comprising:

a reader adapted to obtain measurements defining the coding pattern produced by each coding of the marker when subject to a particular type of stimulus the reader comprising a digital camera; and a data processing system comprising a database of coding pattern measurements;

wherein the data processing system is configured to compare the recorded coding pattern measurements obtained by the reader to the measurements in the database, and wherein the data processing system is configured to match the measurements from the coding pattern with a coding pattern from the database, wherein the digital camera comprises an alignment mechanism allowing the camera to be correctly aligned to the marker such that each coding pattern occurs in the same position in an image, and wherein the alignment mechanism comprises alignment marks on the outer body of the reader which can be used to correctly align it to the marker.

40. The system of claim 39, wherein the digital camera forms part of the reader and is orientated specifically in respect of the marker such that each coding pattern can be identified.

41. The system of claim 39, wherein the marker comprises one or more alignment features to assist in aligning the digital camera to the marker.

42. The system of claim 41, wherein the alignment features comprise visible features.

43. The system of claim 41, wherein the alignment features comprise features which are visible when the marker is subjected to one or more forms of stimulus.

44. The system of claim 39, wherein the digital camera comprises software to align the recorded coding pattern measurements obtained by the reader to the measurements in the database.

45. The system of claim 39, wherein the digital camera comprises illumination means configured to illuminate the marker and capture an image of the coding pattern during illumination.

46. The system of claim 45, wherein the reader comprises software configured to ensure that the coding pattern is measured only during the period when the illumination means is on.

47. The system of claim 39, wherein the reader further comprises lasers.

48. The system of claim 47, wherein the reader further comprises an IR diode laser and a beam expander.

49. The system of claim 47, wherein the reader further comprises an IR LED array.

50. The system of claim 39, wherein the reader is battery powered.

51. The system of claim 39, wherein the data processing system is configured to store the measurements.

52. The system of claim 39, wherein the data processing system is configured to store the measurements as separate data sets.

53. The system of claim 39, wherein the data processing system is maintained on a laptop.

54. The system of claim 39, wherein the data processing system is maintained as a program on a mobile phone.

* * * * *